United States Patent
Kawano

(10) Patent No.: US 6,204,892 B1
(45) Date of Patent: Mar. 20, 2001

(54) CIRCUIT FOR CLAMPING PEDESTAL SIGNAL

(75) Inventor: Tsutomu Kawano, Tokyo (JP)

(73) Assignee: Matsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/201,091

(22) Filed: Nov. 30, 1998

(30) Foreign Application Priority Data

Jun. 24, 1998 (JP) .................................................. 10-176891

(51) Int. Cl.[7] ..................................................... H04N 5/18

(52) U.S. Cl. ........................... 348/691; 348/695; 348/697

(58) Field of Search ..................................... 348/689, 673, 348/677, 691, 692, 695, 697; H04N 5/18

(56) References Cited

U.S. PATENT DOCUMENTS 5,410,366  *  4/1995  Hostetler ............................... 348/695

FOREIGN PATENT DOCUMENTS

| 3-226074 | 10/1991 | (JP) . |
| 8-098057 | 4/1996 | (JP) . |
| 8-195894 | 7/1996 | (JP) . |

* cited by examiner

*Primary Examiner*—Sherrie Hsia
(74) *Attorney, Agent, or Firm*—McDermott, Will & Emery

(57) ABSTRACT

A clamping circuit with a low-pass filter inserted in a feedback loop from an output terminal of a comparator to variable current sources for obtaining a feedback signal having only a DC component or having only a substantial portion of a DC component obtained by removing an AC component due to a burst signal from the output signal of the comparator.

4 Claims, 10 Drawing Sheets

PRIOR ART

PRIOR ART

US 6,204,892 B1

CIRCUIT FOR CLAMPING PEDESTAL SIGNAL

FIELD OF THE INVENTION

The present invention relates to a clamping circuit and, more particularly to a pedestal clamping circuit for clamping a pedestal potential of an input signal consisting of a pedestal signal and a burst signal superimposed thereto to a specified potential.

BACKGROUND OF THE INVENTION

In general, average potential of video signals varies according to the information it contains, especially according to the brightness of the video signals. Therefore, a clamping circuit (described as a pedestal clamping circuit hereinafter) is generally provided in a semiconductor integrated circuit used for processing video signals, in order to keep a sink chip DC (DC indicates a direct current hereinafter) potential or a pedestal DC potential at a constant value.

This pedestal clamping circuit requires a clamping pulse synchronized to a timing of a pedestal signal to maintain a pedestal level at a constant DC potential. For a period when this clamping pulse is received in the pedestal clamping circuit, comparison is made between a pedestal DC potential of an input video signal and a DC potential of a clamping target (described as a reference potential hereinafter).

The difference obtained through the comparison is fed back, and the potential of the DC component of the video signal is adjusted according to the difference, by which the pedestal DC potential can be kept constant. Accordingly, when a timing of a clamping pulse is displaced from a timing of a pedestal signal, the pedestal signal can not be clamped to a desired DC potential.

FIG. 7 shows a simulated view of a pedestal clamping circuit based on the conventional technology. This pedestal clamping circuit comprises an input terminal 11 to which a video signal is inputted from an external device, a resistor 12 with one terminal thereof connected to the input terminal 11, a comparator 13 with a reversed input terminal thereof connected to the other terminal of the resistor 12, a constant voltage power unit 14 for loading a reference potential Vped to a non-reversed input terminal of the comparator 13, a pair of variable current sources 15, 16 connected to the other terminal the resistor 12 and an amount of current of each of which is controlled by output from the comparator 13, and a feedback capacitor 17 connected to an output terminal of the comparator 13.

A clamping pulse is inputted into the comparator 13 at a specified timing. Output from the pedestal clamping circuit can be obtained at the other edge of the resistor 12. The variable current source 15 is connected between the other edge of the resistor 12 and a positive supply voltage Vcc, while the variable current source 16 is connected between the other edge of the resistor 12 and a ground GND.

Effects due to the pedestal clamping circuit shown in FIG. 7 are explained. A video signal having been inputted from the input terminal 11 is then inputted to the reversed input terminal of the comparator 13 through the resistor 12. The video signal inputted into the comparator 13 consists of a pedestal signal to which a burst signal is superimposed as a reference for a color density or a color tone. The comparator 13 compares a potential of a video signal to the reference potential Vped during a period when a clamping pulse is received (e.g., a period when a clamping pulse is a relatively high potential level (described as a "H (high)" level hereinafter)), generates and outputs a feedback signal S1 according to the difference and outputs. The feedback signal S1 is fed back to the variable current sources 15, 16.

As a result of the feedback, when a potential of the video signal is lower than the reference potential Vped, current flows into the resistor 12 from the variable current source 15 which is at a higher potential so that the potential of the video signal is higher. On the contrary, when the potential of the video signal is higher than the reference potential Vped, current is drawn out from the resistor 12 by the variable current source 16 which is at a lower potential so that the potential of the video signal becomes lower. Thus, the resistor 12 and the variable current source 15 form a positive potential loading unit, while the resistor 12 and the variable current source 16 form a negative potential loading unit.

The capacitor 17 is charged or discharged according to an output from the comparator 13. This capacitor 17 maintains the charged state for a period when a clamping pulse is not received (e.g., a period when a clamping pulse is at a relatively low level (described as a "L (low)" level hereinafter)).

FIG. 8 shows a detail circuit configuration of the pedestal clamping circuit. This pedestal clamping circuit has an emitter-follower circuit 21 comprising an NPN transistor Tr1. A positive power voltage Vcc is applied to the collector of the NPN transistor Tr1 of this emitter-follower circuit 21, the emitter is branched and connected to one terminal of the resistor 12 and to the ground GND through another resistor 22, and a video signal is inputted into the base thereof.

This pedestal clamping circuit has a differential amplifier. The differential amplifier comprises a constant current source 23 connected to a power line with a positive power voltage Vcc applied thereto, a differential pair 24 of PNP transistors Tr2, Tr3 the emitters of each of which are connected to the constant current source 23, and a current mirror circuit 25 comprising a pair of NPN transistors Tr4, Tr5 connected to the differential pair 24 respectively. The differential pair 24 and current mirror circuit 25 correspond to the variable current source 15 and to the variable current source 16 shown in FIG. 7 respectively.

A specified bias potential is applied to the base of the PNP transistor Tr2 by a DC bias source 26. Inputted to the base of the PNP transistor Tr3 is an output from a circuit constituting a comparator described later. Collectors of the PNP transistors Tr2, Tr3 are connected to the collectors of the NPN transistors Tr4, Tr5.

The base terminals of the pair of NPN transistors Tr4, Tr5 are connected to the collector of the PNP transistor Tr3 in the side where output (namely a feedback signal S1) from a circuit constituting the comparator described later is inputted to the base thereof in the differential pair 24. Namely, in the NPN Transistor Tr5 connected to the side where output from the comparator described later of the current mirror circuit 25 is inputted to the base thereof, the base and the collector thereof are short-circuited. Each emitters of the pair of NPN transistors Tr4, Tr5 is connected to the ground GND.

The other terminal of the resistor 12 is connected to the output from the differential amplifier comprising the constant current source 23, differential pair 24 and current mirror circuit 25. In addition, the output from this differential amplifier is supplied to an external device, branched and inputted to a differential pair as one of circuits constituting the comparator described later.

The comparator comprises a current mirror circuit 27 comprising a pair of PNP transistors Tr6, Tr7 each having an emitter connected to the power line with a positive voltage Vcc loaded thereto; a differential pair 28 of NPN transistors Tr8, Tr9 connected to the current mirror circuit 27; and a constant current source 29 to which emitters of the NPN transistors Tr8, Tr9 constituting the differential pair 28 are connected through a switching element 30.

This comparator corresponds to the comparator 13 shown in FIG. 17. The output from this comparator is supplied to the base of the PNP transistor Tr3 constituting the differential pair 24 of the differential amplifier as described above, branched and supplied to the feedback capacitor 17. The other terminal of the constant current source 29 is connected to the ground GND.

The base terminals of the pair of PNP transistors Tr6, Tr7 are connected to the collector of the PNP transistor Tr7. Namely, in the PNP transistor Tr7 which is one of the two transistors constituting the current mirror circuit 27, the base and the collector are short-circuited. Each collectors of the PNP transistors Tr6, Tr7 are connected to the collectors of NPN transistors Tr8, Tr9 respectively.

A reference potential Vped is applied by the constant voltage power unit 14 shown in FIG. 7 to the base of the NPN transistor Tr9, connected to the line of the PNP transistor Tr7 with the base and collector short-circuited in the current mirror circuit 27. The base of the other NPN transistor Tr8 is connected to the other terminal of the resistor 12 as well as to the output terminal of the differential amplifier, and a video signal is inputted to the base terminal.

The switching element 30 whose opening and closing is controlled by the clamping pulse is provided. The switching element 30 is closed, for instance, when the clamping pulse is at the "H" level, and is opened when the clamping pulse is at the "L" level. Accordingly, only when the clamping pulse is at the "H" level, the comparator comprising the current mirror circuit 27, differential pair 28 and the constant current source 29 operates.

FIG. 9 shows a relation between the timing of a video signal and a clamping pulse. When the clamping pulse is ON, namely when it is at "H" level, the comparator comprising the current mirror circuit 27, differential pair 28 and the constant current source 29 compares the reference potential Vped supplied by the constant voltage power unit 14 to a pedestal potential of a video signal. The capacitor 17 charges or discharges according to the result of the comparison, and the result is maintained by the capacitor 17 when the clamping pulse is OFF, namely when it is at the "L" level. On the other hand, the differential amplifier comprising the constant current source 23, differential pair 24 and the current mirror circuit 25 controls a current passing through the resistor 12 according to the voltage maintained by the capacitor 17.

Thus, when a pedestal potential is higher than the reference potential Vped, the capacitor 17 is discharged and the voltage decreases. When input to the differential amplifier is lower than the reference potential (a specified bias potential applied by the DC bias source 26) of the differential amplifier, the current mirror circuit 25 works so that a current is drawn from the resistor 12. As a result, a pedestal DC potential at the output terminal decreases.

On the other hand, when the pedestal potential is lower than the reference potential Vped, the capacitor 17 is charged and the voltage increases. Then, when input to the differential amplifier is higher than the reference potential (a specified bias potential applied by the DC bias source 26) of the differential amplifier, the differential pair 24 works so that a current is supplied to the resistor 12. As a result, a pedestal DC potential at the output terminal increases. As a result of the feedback as described above, the pedestal potential of the video signal to be outputted is equal to the reference potential Vped.

Clamping circuits are disclosed, for instance, in Japanese Patent Laid-Open Publication No. HEI 8-98057, Japanese Patent Laid-Open Publication No. HEI 8-195894 and Japanese Patent Laid-Open Publication No. HEI 3-226074.

In a case of an actual complex video signal, a burst signal exists in a front porch section thereof. The burst signal occupies, as shown in FIG. 9, most of the pedestal section in the complex video signal and it is extremely difficult to set a clamping pulse in portion where the burst signal is absent. Accordingly, a burst signal exists in the clamping period set by a clamping pulse. A frequency of the burst signal is around 3.58 MHz (or around 4.43 MHz), and a comparator generally reacts to a signal at this frequency.

Accordingly, in the pedestal clamping circuit shown in FIG. 7 and FIG. 8, as a result of comparison between the reference potential Vped and a potential of a video signal in a comparator, an AC component derived from the burst signal is outputted together with a feedback DC voltage to a terminal of the feedback capacitor, as shown in FIG. 10, as a result of which the comparator tries to convert the burst signal to a DC current. Hence, the burst signal in the output video signal is attenuated as compared to that in the input video signal, which results in the fact that the burst signal is damaged. Further, phase of the burst signal may be changed.

Although this drawback can be overcome by using a feedback capacitor having a larger capacitance, the clamping speed becomes extremely slow, and this is not practical.

Also, there is found no consideration on a burst signal included in a video signal in the clamping circuits disclosed in Japanese Patent Laid-Open Publication No. HEI 8-98057, HEI 8-195894 and HEI 3-226074, so that, when a burst signal is superimposed on a pedestal signal, it is not clear whether the pedestal potential can be clamped to a specified reference potential without any damage to the burst signal or not.

SUMMARY OF THE INVENTION

It is an object of the present invention to obtain a clamping circuit which can clamp a pedestal potential to a specified reference potential while suppressing the attenuation of a burst signal in a video signal consisting of a pedestal signal and the burst signal superimposed thereto.

With the invention, a feedback signal having only a DC component or having only a substantial portion of DC component, which DC component is a signal from which an AC component due to burst signal is removed, is generated, and a potential of the DC component of the input signal is controlled according to the feedback signal.

With the invention, an AC component due to a burst signal is removed from a feedback signal outputted from a comparator using a low-pass filter.

With the invention, an AC component due to a burst signal is superimposed on the reference potential, so that, an input signal which includes the burst signal and a signal of the reference potential have AC components in the same phase. Hence, a feedback signal having only the DC component or having only a substantial portion of the DC component is outputted from a comparator.

With the invention, an AC component due to a burst signal is removed from an input signal using a low-pass filter before the input signal is inputted to a comparator, so that a feedback signal having only a DC component or having only a substantial portion of the DC component is outputted from a comparator.

Other objects and features of this invention will become apparent from the following description with reference to the accompanying drawings.

DESCRIPTION OF THE PREFERRED EMBODIMENTS

Figure 1:
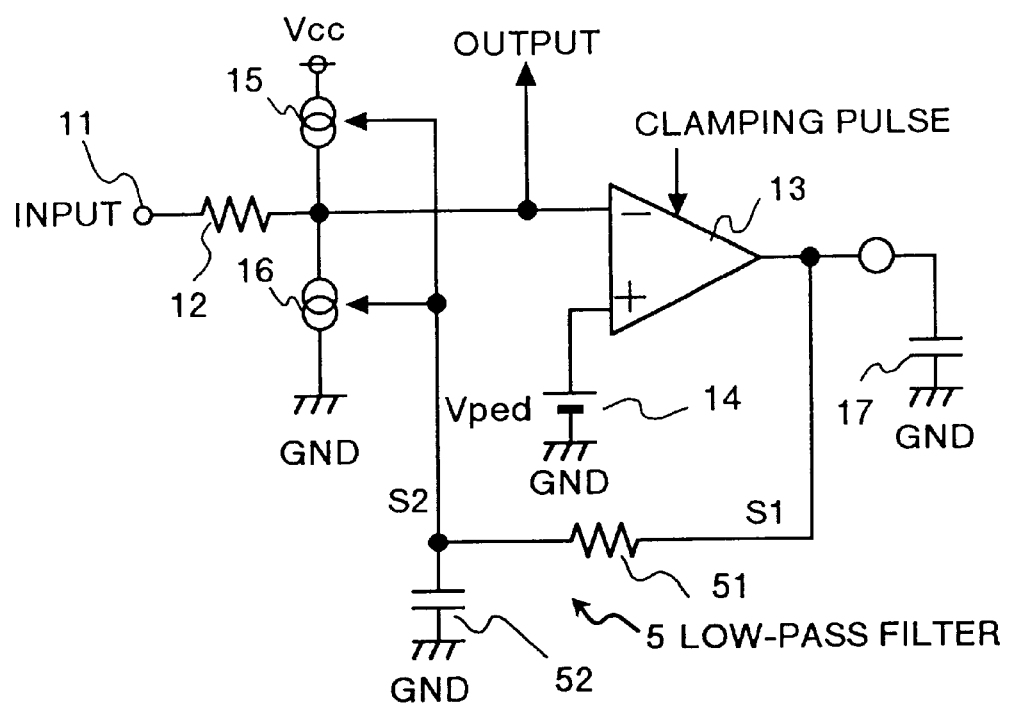
FIG. 1 is a simulated view showing a pedestal clamping circuit according to Embodiment 1 of the present invention.

Detailed description is made hereinafter for preferred embodiments of the clamping circuit according to the present invention with reference to the related drawings. FIG. 1 is a simulated view showing circuit configuration of the pedestal clamping circuit according to Embodiment 1 of the present invention. The pedestal clamping circuit according to Embodiment 1 shown in FIG. 1 differs from the conventional type of pedestal clamping circuit shown in FIG. 7 in that a low-pass filter 5 is provided at some place in a feedback loop formed by the output terminal of the comparator 13 and the variable current sources 15 and 16.

In the figure, the low-pass filter 5 comprises a resistor 51 and a capacitor 52. Resistance of the resistor 51 and capacitance of the capacitor 52 are selected according to a cutoff frequency f of the filter expressed by the following equation (1).

$$f = \frac{1}{2} \cdot \pi \cdot (\text{Resistance}) \cdot (\text{Capacitance}) \quad (1)$$

Figure 7:
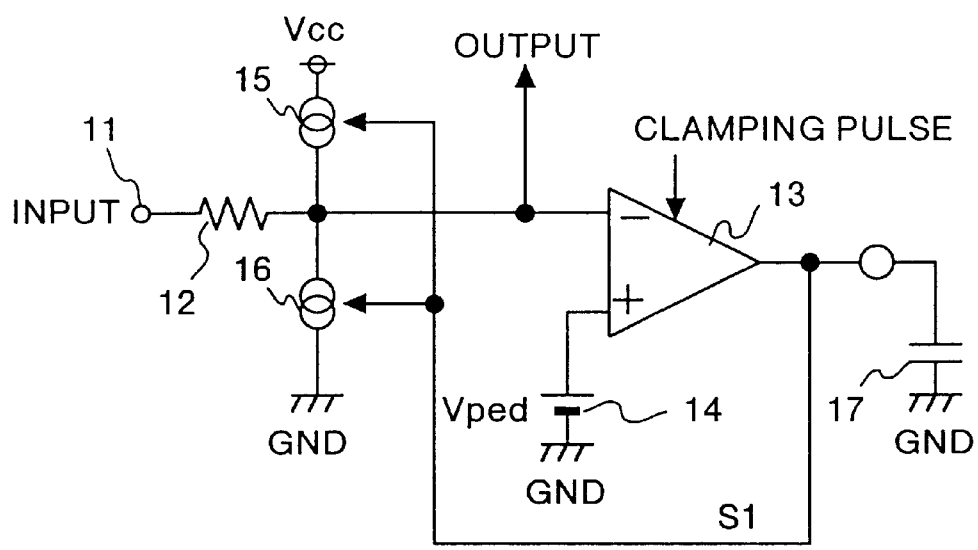
FIG. 7 is a simulated view showing a pedestal clamping circuit based on the conventional technology.
Figure 8:
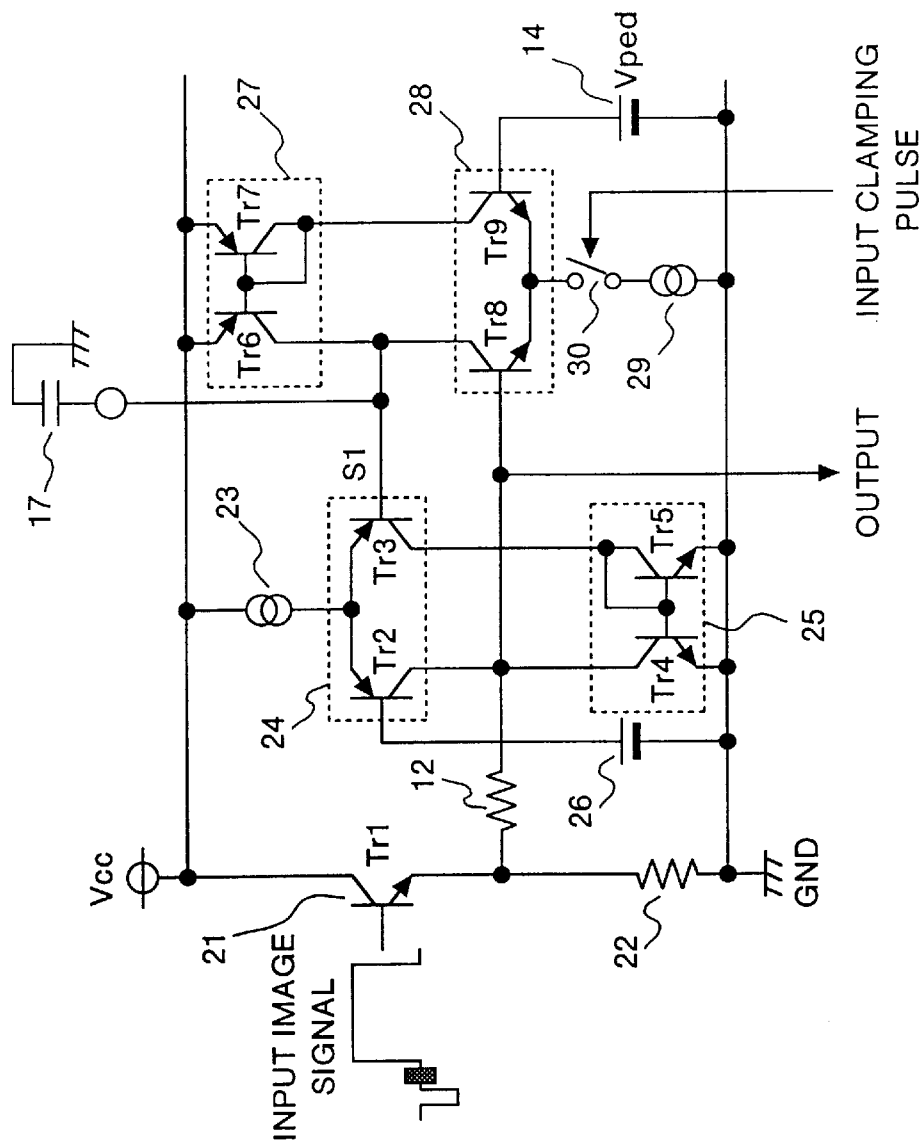
FIG. 8 is a detail circuit diagram showing the conventional pedestal clamping circuit.
Figure 9:
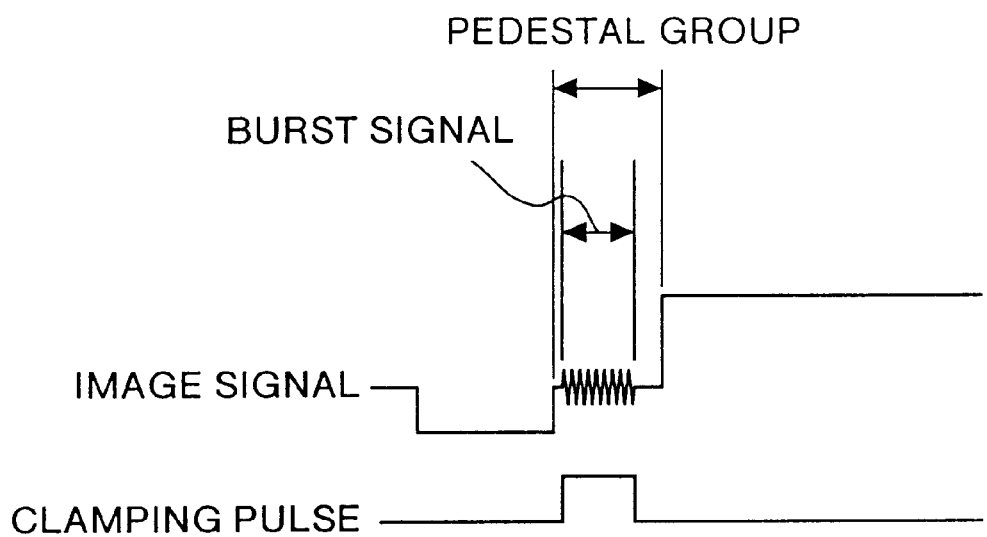
FIG. 9 is a wave form chart for explaining a timing relation between a video signal and a clamping pulse.
Figure 10:
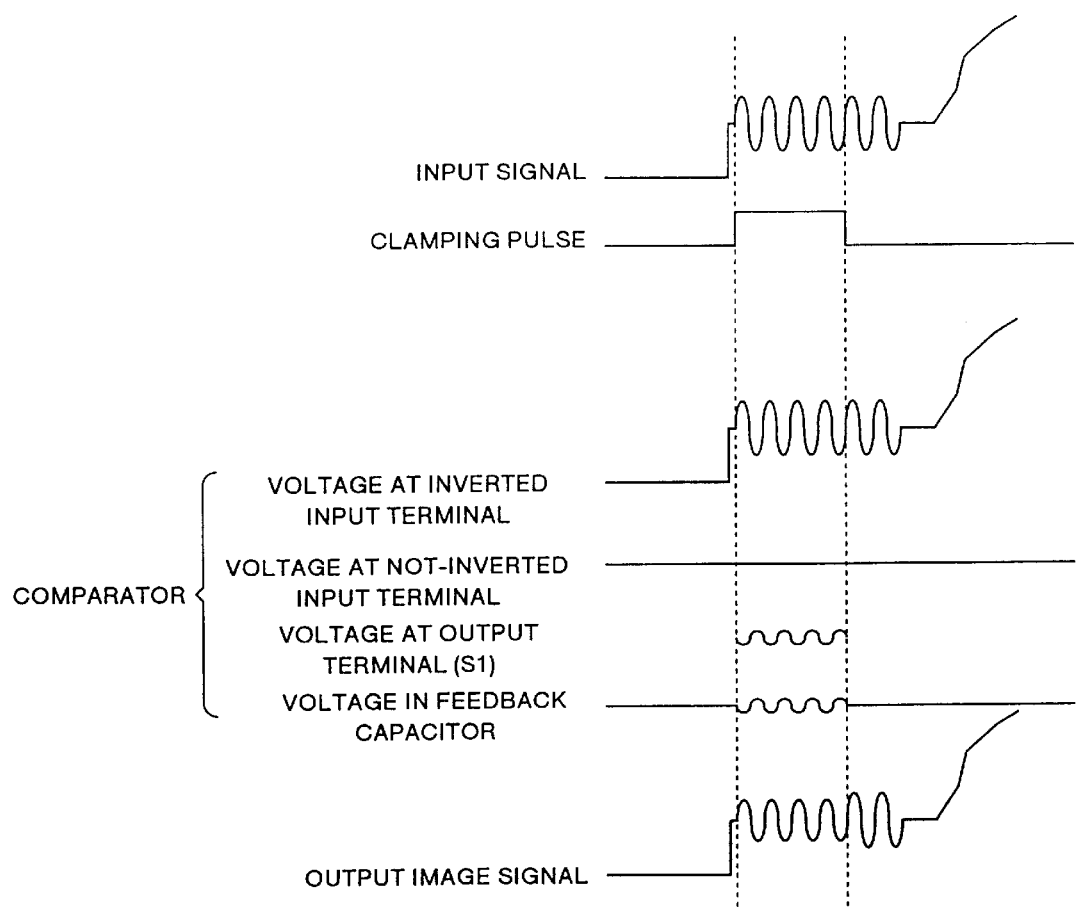
FIG. 10 is a wave form chart for explaining how a burst signal is attenuated in the conventional type of pedestal clamping circuit.

Remaining configuration is the same as that of the pedestal clamping circuit shown in FIG. 7. Namely, the pedestal clamping circuit shown in FIG. 1 comprises an input terminal 11 with a video signal inputted thereto from an external device, a resistor 12 with one terminal thereof connected to the input terminal 11, a comparator 13 with a reversed input terminal thereof connected to the other terminal of the resistor 12, a constant voltage power unit 14 for supplying a reference potential Vped to a non-reversed input terminal of the comparator 13, a pair of variable current sources 15, 16 connected to the other terminal of the resistor 12, and a feedback capacitor 17 connected to the output of the comparator 13.

A feedback signal S1 outputted from the comparator 13 becomes a signal S2 having only a DC component or having only a substantial portion of a DC component from which an AC component due to a burst signal is removed therefrom using the low-pass filter 5 inserted in the feedback loop, and the signal S2 is supplied to the variable current sources 15 and 16.

Figure 2:
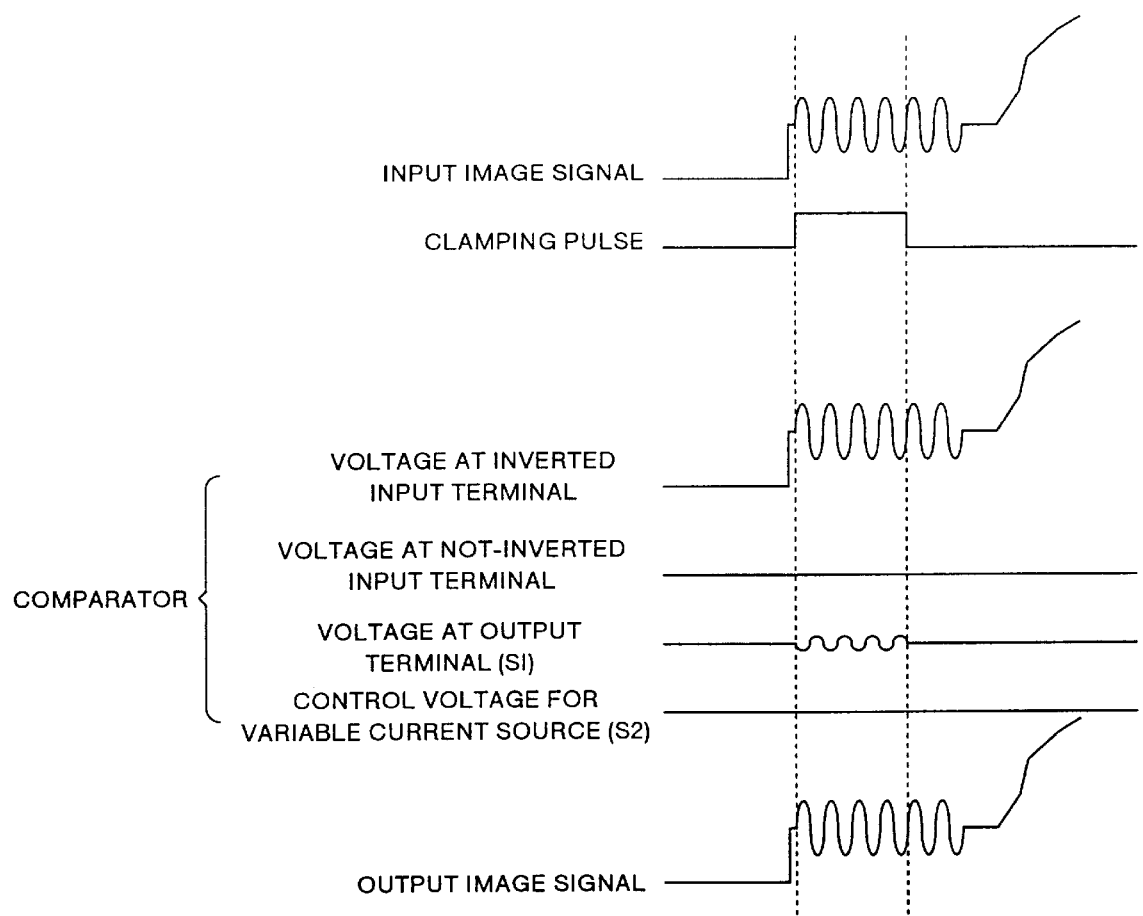
FIG. 2 is a wave form chart for explaining effects of the pedestal clamping circuit of Embodiment 1.

Effects of the pedestal clamping circuit shown in FIG. 1 are explained with reference to FIG. 2. FIG. 2 shows a wave form of a signal in each section of the pedestal clamping circuit. A video signal inputted into a reversed input terminal of the comparator 13 consists of a pedestal signal and a burst signal superimposed thereto. Then, an AC component derived from the burst signal is superimposed to a voltage at the output terminal of the comparator 13, namely to a feedback signal S1 during the clamping period. However, the feedback signal S2 obtained after passing the signal S1 through the low-pass filter 5, namely a voltage for controlling the variable current sources 15 and 16 is a signal having only a DC component or having only a substantial portion of a DC component obtained by removing an AC component therefrom with the low-pass filter 5.

With Embodiment 1, by adding the low-pass filter 5 into the feedback loop, the feedback signal S2 used for controlling the variable current sources 15, 16 is converted into a signal having only a DC component or having only a substantial portion of a DC component obtained by removing an AC component due to a burst signal therefrom, so that a pedestal potential can be clamped to a specified reference potential while suppressing the attenuation of the burst signal in a video signal consisting of the pedestal signal and the burst signal superimposed thereto with a configuration obtained simply by adding the low-pass filter 5 thereto.

Figure 3:
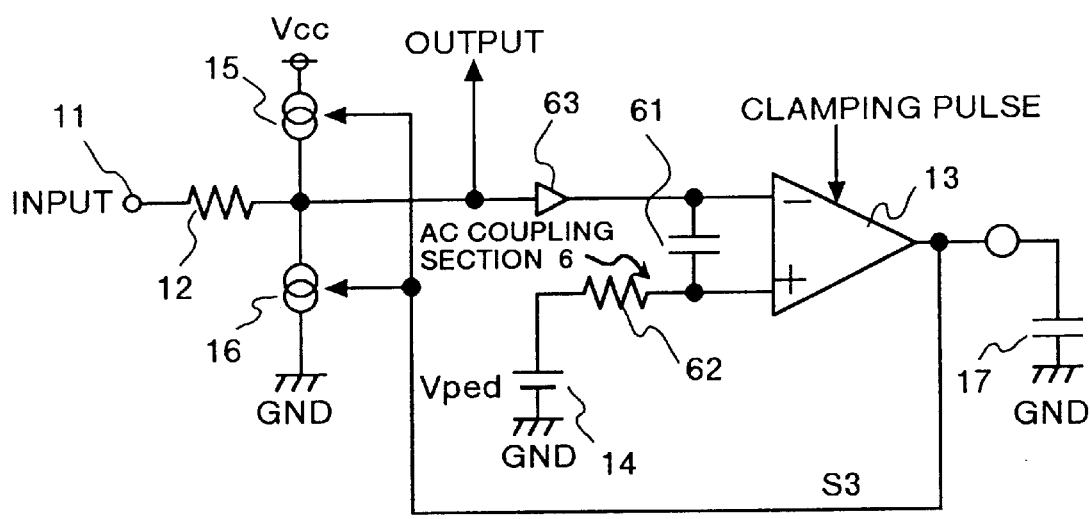
FIG. 3 is a simulated view showing a pedestal clamping circuit according to Embodiment 2 of the present invention.

FIG. 3 is a simulated view showing circuit configuration of a pedestal clamping circuit according to Embodiment 2 of the present invention. The pedestal clamping circuit according to Embodiment 2 shown in FIG. 3 differs from the conventional type of pedestal clamping circuit shown in FIG. 7 in that, a capacitor 61 is provided in between the reversed and the non-reversed input terminals of the comparator 13 for superimposing only an AC component due to a burst signal to a reference potential Vped of clamping, an AC coupling section 6 with a resistor 62 connected in between the capacitor 61 and constant voltage power unit 14 for generating a reference potential is provided, and a buffer 63 for separating an output signal from the clamping circuit from a signal inputted to the comparator 13 is provided in between a branch point to output from this clamping circuit and the capacitor 61 for the AC coupling section 6. Since the remaining configuration is the same as that of the pedestal clamping circuit shown in FIG. 7, description thereof is omitted herein.

The buffer 63 comprises an emitter-follower circuit in which, for instance, an NPN transistor or a PNP transistor is used.

Figure 4:
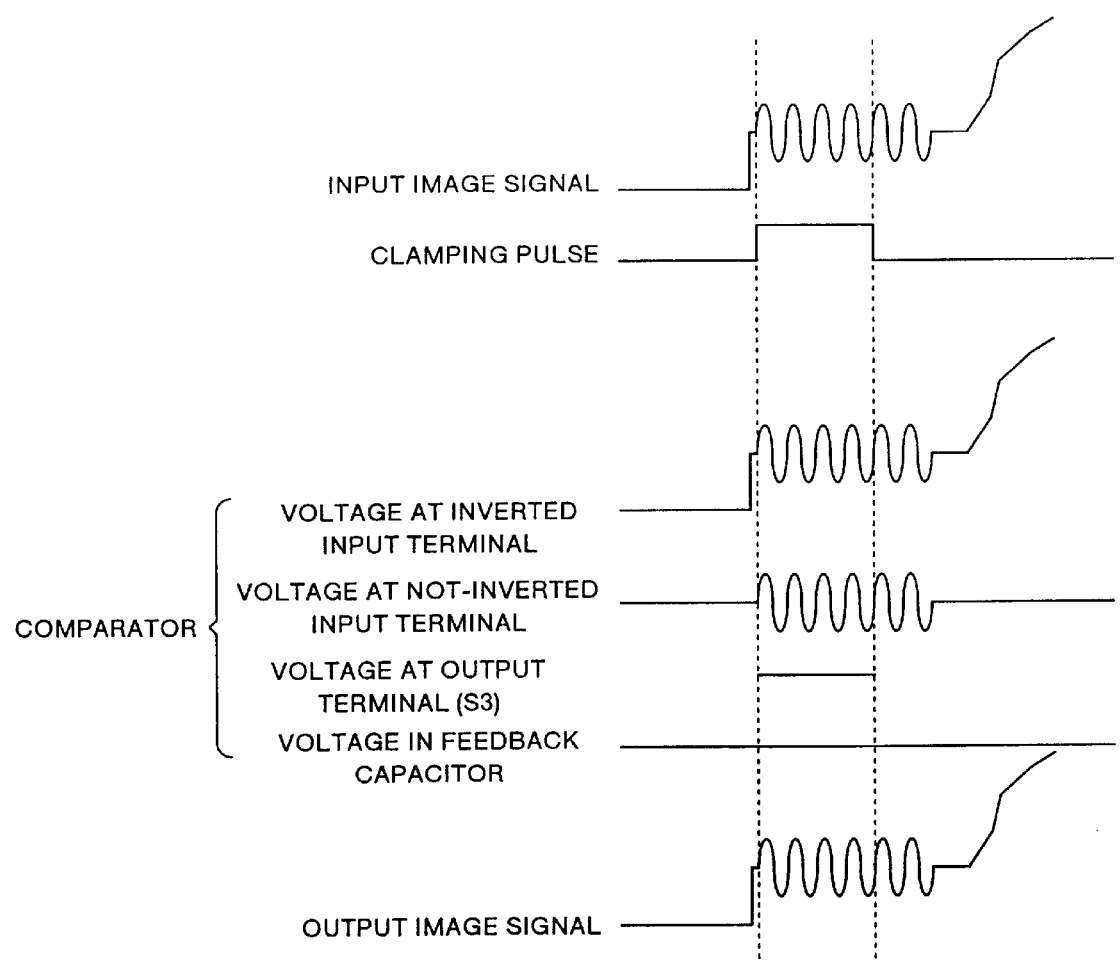
FIG. 4 is a wave form chart for explaining effects of the pedestal clamping circuit of Embodiment 2.

Effects of the pedestal clamping circuit shown in FIG. 3 are explained with reference to FIG. 4. FIG. 4 shows a wave form of a signal in each section of the pedestal clamping circuit. A video signal inputted to a reversed input terminal of the comparator 13 consists of a pedestal signal and a burst signal superimposed thereto. While, a signal inputted to a non-reversed input terminal of the comparator 13 consists of a reference voltage Vped and an AC component due to the burst signal superimposed thereto by the AC coupling section 6. Accordingly, signals having the same AC component are inputted to the reversed and non-reversed input terminals of the comparator 13, and with this feature, a voltage at the output terminal of the comparator 13, namely a feedback signal S3 becomes a signal having only a DC component or having only a substantial portion of a DC component with no AC component therein. Namely, only a feedback DC voltage is outputted to a terminal of the feedback capacitor.

With Embodiment 2, by AC-coupling the reversed input terminal to the non-reversed input terminal of the comparator 13, a potential as a reference of clamping also becomes a signal consisting of a reference potential Vped and an AC component due to a burst signal superimposed thereto like the input video signal, and with this feature, a feedback signal having only a DC component or having only a substantial portion of a DC component is outputted from the comparator 13. Thus, a pedestal potential can be clamped to a specified reference potential while suppressing the attenuation of the burst signal in a video signal consisting of the pedestal signal and the burst signal superimposed thereto with configuration obtained simply by adding, for instance, an RC circuit for AC coupling.

Figure 5:
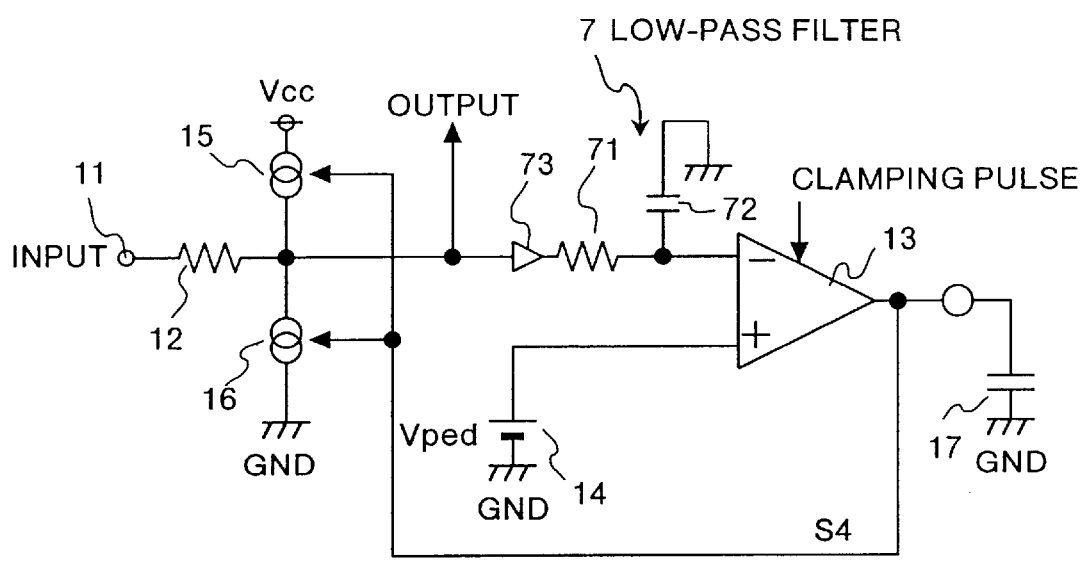
FIG. 5 is a simulated view showing a pedestal clamping circuit according to Embodiment 3 of the present invention.

FIG. 5 is a simulated view showing circuit configuration of a pedestal clamping circuit according to Embodiment 3 of the present invention. The pedestal clamping circuit according to Embodiment 3 shown in FIG. 5 differs from the conventional type of pedestal clamping circuit shown in FIG. 7 in points that, in order to input a signal having only a DC component or having only a substantial portion of a DC component obtained by removing an AC component due to a burst signal to the reversed input terminal of the comparator 13, a low-pass filter 7 is provided in an immediate upstream side of the reversed input terminal of the comparator 13, and a buffer 73 for separating an output signal from the clamping circuit from a signal inputted to the comparator 13 is provided in between a branch point to output from this clamping circuit and the low-pass filter 7 in order not to give any influence due to the low-pass filter 7 to an original signal. Since the remaining configuration is the same as that of the pedestal clamping circuit shown in FIG. 7, description thereof is omitted herein.

In the figure, the low-pass filter 7 comprises a resistor 71 and a capacitor 72. Resistance of the resistor 71 and capacitance of the capacitor 72 are selected according to a cutoff frequency f of the filter expressed by the Equation (1) described above.

The buffer 73 comprises an emitter-follower circuit in which, for instance, an NPN transistor or a PNP transistor is used.

Figure 6:
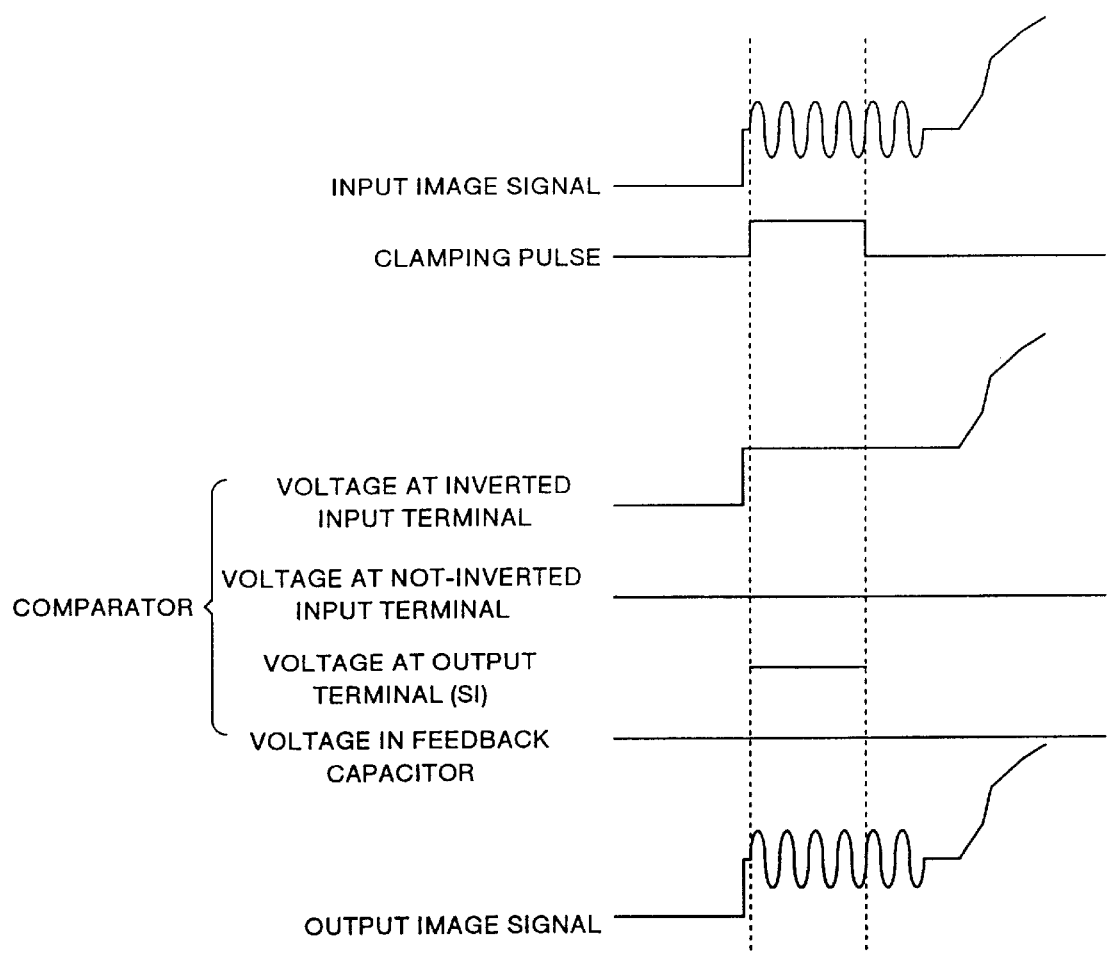
FIG. 6 is a wave form chart for explaining effects of the pedestal clamping circuit of Embodiment 3.

Effects of the pedestal clamping circuit shown in FIG. 5 are explained with reference to FIG. 6. FIG. 6 shows a wave form of a signal in each section of the pedestal clamping circuit. A video signal inputted to a reversed input terminal of the comparator 13 is a signal having only a DC component or having only a substantial portion of a DC component obtained by removing an AC component due to burst signal therefrom using the low-pass filter 7. With this feature, a signal having only a DC component or having only a substantial portion of a DC component is inputted to the reversed input terminal as well as to the non-reversed input terminal for the comparator 13, and with this feature, a voltage at the output terminal of the comparator 13, namely a feedback signal S4 becomes a signal having only a DC component or having only a substantial portion of a DC component with no AC component therein. Namely, only a feedback DC voltage is outputted to the terminal of the feedback capacitor.

With Embodiment 3, by adding the low-pass filter 7 to an immediate upstream side of the reversed input terminal of the comparator 13, an output signal from the comparator 13 becomes a signal having only a DC component or having only a substantial portion of a DC component with no AC component due to a burst signal therein, so that a pedestal potential can be clamped to a specified reference potential while suppressing the attenuation of the burst signal in a video signal consisting of the pedestal signal and the burst signal superimposed thereto with configuration obtained simply by adding the low-pass filter 7 thereto.

Having described the present invention, it is obvious that modification and variation of the present invention is possible in light of the above teachings. For example, the low-pass filters 5, 7 and the AC coupling section 6 are not limited to the configuration in the embodiments described above.

In addition, the present invention is not limited to a pedestal clamping circuit for clamping a pedestal potential of a video signal consisting of a pedestal signal and a burst signal superimposed thereto to a specified potential, and is applicable to a clamping circuit for clamping a potential of a DC component to a specified potential without attenuating an AC component for a signal consisting of a DC component and the AC component superimposed thereto.

As described above, with the invention, a feedback signal having only a DC component or having only a substantial portion of the DC component obtained by removing an AC component due to a burst signal is generated, and a potential of the DC component of the input signal is controlled according to the feedback signal, so that a pedestal potential can be clamped to a specified reference potential while attenuation of a burst signal can be suppressed in a video signal consisting of a pedestal signal and the burst signal superimposed thereto.

With the invention, an AC component due to a burst signal is removed from a feedback signal outputted from a comparator with a low-pass filter, so that a pedestal potential can be clamped to a specified reference potential while attenuation of a burst signal can be suppressed in a video signal consisting of a pedestal signal and the burst signal superimposed thereto with configuration obtained simply by adding a low-pass filter to a feedback loop.

With the invention, by superimposing an AC component due to a burst signal to a reference potential, an input signal including the burst signal and a signal of the reference potential have AC components in phase with each other, and a feedback signal having only a DC component or having only a substantial portion of the DC component is outputted from a comparator, so that a pedestal potential can be clamped to a specified reference potential while attenuation of a burst signal can be suppressed in a video signal consisting of a pedestal signal and the burst signal superimposed thereto with configuration obtained simply by adding an RC circuit thereto for superimposing an AC component due to a burst signal to a reference potential.

With the invention, an AC component due to a burst signal is removed from an input signal with a low-pass filter before the input signal is inputted to a comparator, thus, a feedback signal for only or for only a substantial portion of the DC component is outputted from a comparator, so that a pedestal potential can be clamped to a specified reference potential while attenuation of a burst signal can be suppressed in a video signal consisting of a pedestal signal and the burst signal superimposed thereto with configuration obtained simply by adding a low-pass filter to an upstream side from a terminal with an input signal received therein of a comparator.

This application is based on Japanese patent application No. HEI 10-176891 filed in the Japanese Patent Office on Jun. 24, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A clamping circuit for receiving an input signal consisting of a pedestal signal and a burst signal superimposed thereto and clamping a potential of a DC component of the input signal to a prespecified potential comprising:

a feedback control unit for removing an AC component due to the burst signal to generate a feedback signal having only a DC component or having only a substantial portion of the DC component and controlling a potential of the DC component of the input signal according to the feedback signal.

2. A clamping circuit according to claim 1, wherein said feedback control unit comprises:

a comparator for comparing at a specified timing a potential of an input signal to a DC reference potential;

a low-pass filter for removing the AC component due to the burst signal from the output signal of said comparator;

a positive potential supplying unit for supplying a positive DC potential to said input signal based on the output signal of said low-pass filter; and a negative potential supplying unit for supplying a negative DC potential to said input signal based on the output signal of said low-pass filter.

3. A clamping circuit according to claim 1, wherein said feedback control unit comprises:

a unit for superimposing the AC component due to the burst signal to a DC reference potential;

a comparator for comparing at a specified timing a potential of an input signal to the reference potential to which said AC component due to the burst signal is superimposed thereto;

a positive potential supplying unit for supplying a positive DC potential to said input signal based on the output signal of said comparator; and a negative potential supplying unit for supplying a negative DC potential to said input signal based on the output signal of said comparator.

4. A clamping circuit according to claim 1, wherein said feedback control unit comprises:

a low-pass filter for removing the AC component due to the burst signal from an input signal;

a comparator for comparing at a specified timing a potential of an input signal with said AC component due to the burst signal removed therefrom to a DC reference potential;

a positive potential supplying unit for supplying a positive DC potential to said input signal based on the output signal of said comparator; and a negative potential supplying unit for supplying a negative DC potential to said input signal based on the output signal of said comparator.

* * * * *